(12) United States Patent
Nitanda

(10) Patent No.: US 7,889,987 B2
(45) Date of Patent: Feb. 15, 2011

(54) CAMERA AUTO UV FILTER MODE

(75) Inventor: Hiroyuki Nitanda, Morrisville, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 113 days.

(21) Appl. No.: 12/354,082

(22) Filed: Jan. 15, 2009

(65) Prior Publication Data

US 2010/0178047 A1    Jul. 15, 2010

(51) Int. Cl.
*G03B 7/00* (2006.01)

(52) U.S. Cl. ....................................................... 396/241
(58) Field of Classification Search .................. 396/241
See application file for complete search history.

(56) References Cited

U.S. PATENT DOCUMENTS

| | | | |
|---|---|---|---|
| 6,535,278 B1 * | 3/2003 | Imura | 356/73 |
| 2003/0043272 A1 | 3/2003 | Nagao et al. | |
| 2003/0095185 A1 * | 5/2003 | Naifeh | 348/156 |
| 2003/0122957 A1 | 7/2003 | Emme | |
| 2003/0164872 A1 * | 9/2003 | Machida et al. | 347/187 |
| 2004/0117418 A1 | 6/2004 | Vainsencher et al. | |
| 2004/0239836 A1 | 12/2004 | Chase | |
| 2006/0008267 A1 | 1/2006 | Kim | |
| 2006/0109357 A1 | 5/2006 | Oda | |
| 2006/0142053 A1 | 6/2006 | Garcia et al. | |
| 2007/0133969 A1 | 6/2007 | Ish-Shalom et al. | |
| 2007/0257995 A1 * | 11/2007 | Horowitz et al. | 348/234 |
| 2007/0284450 A1 | 12/2007 | Nelson | |
| 2008/0165421 A1 | 7/2008 | Matsumoto et al. | |
| 2010/0098401 A1 * | 4/2010 | Ismael | 396/241 |

FOREIGN PATENT DOCUMENTS

| | | |
|---|---|---|
| CN | 101212652 | 7/2008 |
| CN | 101212652 A * | 7/2008 |
| CN | 101252612 | 8/2008 |
| GB | 638937 | 6/1950 |
| JP | 7218981 | 8/1995 |
| JP | 2005045559 A * | 2/2005 |
| WO | 2006/093377 | 9/2006 |

OTHER PUBLICATIONS

English translation of CN101212652, Zheng, Guangyuan.*
Machine translation of JP 2005-045559A.*
International Search Report and Written Opinion for the corresponding International Application No. PCT/US2009/050631 mailed Sep. 23, 2009.

* cited by examiner

*Primary Examiner*—Rodney E Fuller
*Assistant Examiner*—Linda B Smith
(74) *Attorney, Agent, or Firm*—Renner, Otto, Boisselle & Sklar, LLP

(57) ABSTRACT

A portable communication device having a camera functionality including a camera lens and a UV filter element moveable into or out of a position covering the camera lens. The device includes an apparatus for detecting a light feature associated with an ambient light condition. The UV filter is automatically moved into or out of a position overlying the camera lens based upon the data determined from the light feature associated with the ambient light condition.

6 Claims, 7 Drawing Sheets

CAMERA AUTO UV FILTER MODE

TECHNICAL FIELD OF THE INVENTION

The present invention relates to a portable communication device that includes camera related features and functionality.

DESCRIPTION OF THE RELATED ART

Portable electronic devices such as mobile telephones have been popular for years and continue to increase in popularity. Over the years, mobile telephones have been provided with functions beyond their conventional voice communication functionality. For example, mobile telephones are now capable of data communications, video transfer, media reproduction, and commercial radio reception. Many mobile telephones today include a camera function for taking pictures and/or video. In a typical mobile telephone with a camera, the camera is mounted inside the housing of the phone. An opening is provided in the surface of the housing for the camera lens. The display can be used to target the lens, or a viewfinder is provided. A user will use the camera function by looking into the display or viewfinder and actuating a shutter release to capture an image.

SUMMARY

According to one aspect of the invention, a portable communication device comprises: camera circuitry for carrying out a camera related operation; a camera lens operatively coupled to the camera circuitry to focus the camera lens; a UV filter element moveable between a first position displaced away from the lens and a second position overlying the lens; an apparatus for detecting a light feature associated with an ambient light condition; and a processing circuit including logic to execute code to: obtain light data related to the detected light feature associated with ambient light detected; and generate a command to drive the movement of the UV filter element into the first or second position based on the light data obtained from the sensor.

In one embodiment, the apparatus for detecting a light feature associated with an ambient light condition detects a brightness level associated with the ambient light.

In one embodiment, the apparatus comprises a brightness sensor.

In one embodiment, the apparatus comprises the camera lens.

In one embodiment, the processing circuit drives the UV filter to the first or second position based on a comparison of the determined brightness level relative to a threshold brightness level.

In one embodiment, the apparatus for detecting a light feature associated with an ambient light condition is a UV sensor, and the UV sensor detects a UV level associated with the ambient light.

In one embodiment, the processing circuit drives the UV filter to the first or second position based on a comparison of the determined UV level relative to a threshold UV level.

In one embodiment, the processing circuit associates the light data from the sensor with (i) an outdoor lighting condition, or (ii) an indoor lighting condition.

In one embodiment, the processing circuit drives the movement of the UV filter into the second position overlying the lens upon a determination that the light data is associated with an outdoor lighting condition.

In one embodiment, the processing circuit drives the movement of the UV filter into a first position displaced away from the lens upon a determination that the light data is associated with an indoor lighting condition.

According to another aspect of the invention a method for automatically positioning a UV filter relative to a camera lens on a portable network communication device having a lens and a camera functionality is provided, the method comprises: determining light data associated with an ambient light condition; and determining, based on the determined light data, if the UV filter element should be in a position (i) overlying the lens, or (ii) displaced away from the camera lens; and controlling a mechanism to move the UV filter element into or out of a position overlying the lens.

In one embodiment, the light data comprises determining a UV level associated with the ambient light condition.

In one embodiment, the method comprises (i) moving the UV filter into a position overlying the lens when the UV level is above a threshold UV level, and/or (ii) moving the UV filter into a position displaced away from the lens when the UV level is below a threshold UV level.

In one embodiment, determining the light data comprises determining a brightness level associated with the ambient light condition.

In one embodiment, the method comprises (i) moving the UV filter into a position overlying the lens when the brightness level is above a threshold brightness, and/or (ii) moving the UV filter into a position displaced away from the lens when the brightness level is below a threshold level.

In one embodiment, the method comprises: associating the light data with (i) an outdoor lighting condition, or (ii) an indoor light condition; and moving the UV filter into a position overlying the lens in response to the light data being associated with an outdoor lighting condition, or moving the UV filter into a position displaced away from the lens in response to the light data being associated with an indoor lighting condition.

In one embodiment, the method comprises determining a brightness level of the ambient light condition, and associating the brightness level with (i) an outdoor light condition, or (ii) an indoor lighting condition.

According to still another aspect of the present invention a computer program stored on a machine readable medium is provided, the program being suitable for providing a command to drive the movement of and change the position of a UV filter relative to a camera lens on a portable communication device having such components, wherein, when the program is loaded and executed in the portable communication device, the program causes the device to (i) obtain light data related to a detected light feature associated with an ambient light condition, and (ii) generate a command to drive the movement of the UV filter into or out of an optical pathway of the device.

These and other features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described or illustrated with respect to one embodiment may be used in the same way or in a similar way in one or more other embodiments and/or in combination with or instead of the features of the other embodiments.

It should be emphasized that the term "comprises/comprising" when used in the specification is taken to specify the presence of stated features, integers, steps, or components, but does not preclude the presence or addition of one or more features, integers, steps, components, or groups thereof.

BRIEF DESCRIPTION OF THE DRAWINGS

Aspects of the invention may be better understood with reference to the following drawings. The components of the drawings are not necessarily to scale, emphasis instead being placed upon clearly illustrating the principles of the present invention. Likewise, elements and features in one drawing may be combined with elements and features depicted in other drawings. Moreover, like reference numerals designate corresponding parts throughout the several views.

While the diagrams or flow charts may show a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores, or messages may be added to the logical flow for purposes of enhanced utility, accounting, performance, measurement, troubleshooting, and the like. It is understood that all such variations are within the scope of the present invention.

DETAILED DESCRIPTION OF EMBODIMENTS

The terms "electronic equipment" and "electronic device" include portable radio communication equipment. The term "portable radio communication equipment," which hereinafter is referred to as a "mobile radio terminal," includes all equipment such as mobile telephones, pagers, communicators, i.e., electronic organizers, personal digital assistants (PDAs), smartphones, portable communication apparatus or the like. The term "portable communication device" includes any portable electronic equipment including, for example, mobile radio terminals, mobile telephones, mobile devices, mobile terminals, communicators, pagers, electronic organizers, personal digital assistants, smartphones and the like. The term "portable communication device" also may include portable digital music players and/or video display devices.

In the present application, aspects of the invention are described primarily in the context of a mobile telephone. However, it will be appreciated that the invention is not intended to be limited to a mobile telephone and can be any type of portable electronic equipment.

Figure 1:
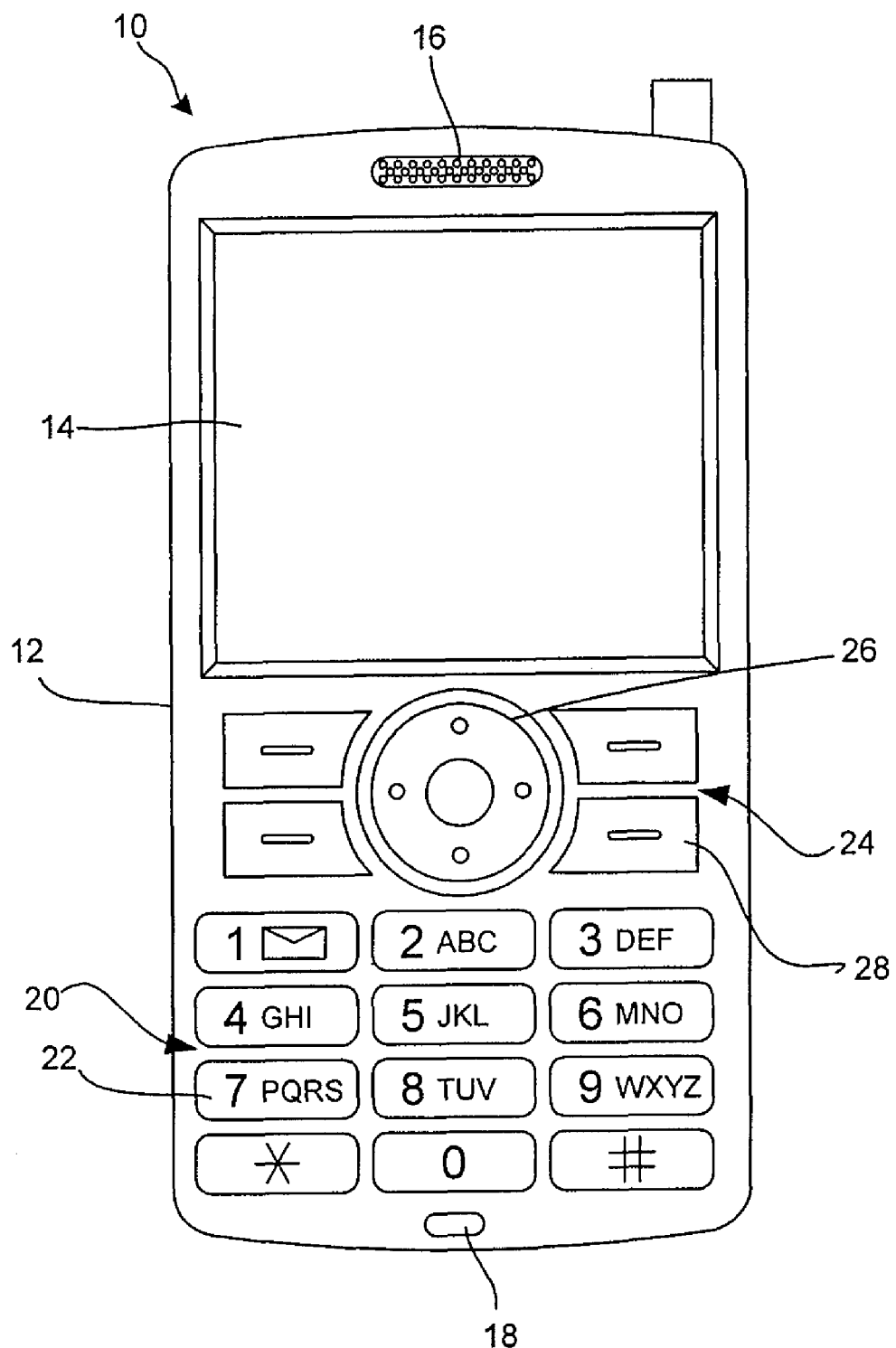
FIG. 1 is a front view of an electronic device in an exemplary embodiment of the present invention.

Referring to FIG. 1, an electronic device 10 suitable for use with the disclosed methods and applications is shown. The electronic device 10 in the exemplary embodiment is shown as a portable network communication device, e.g., a mobile telephone, and will be referred to as the mobile telephone 10. The mobile telephone is shown as having a "brick" or "block" design type housing, but it will be appreciated that other type housings, such as clamshell housing or a slide-type housing, may be utilized without departing from the scope of the invention.

As illustrated in FIG. 1, the mobile telephone 10 may include a user interface that enables the user to easily and efficiently perform one or more communication tasks (e.g., enter in text, display text or images, send an E-mail, display an E-mail, receive an E-mail, identify a contact, select a contact, make a telephone call, receive a telephone call, etc.). The mobile phone 10 includes a housing 12, display 14, speaker 16, microphone 18, a keypad 20, and a number of keys 24. The display 14 may be any suitable display, including, e.g., a liquid crystal display, a light emitting diode display, or other display. The keypad 20 comprises a plurality of keys 22 (sometimes referred to as dialing keys, input keys, etc.). The keys 22 in keypad area 20 may be operated, e.g., manually or otherwise to provide inputs to circuitry of the mobile phone 10, for example, to dial a telephone number, to enter textual input such as to create a text message, to create an email, or to enter other text, e.g., a code, pin number, security ID, to perform some function with the device, or to carry out some other function.

The keys 24 may include a number of keys having different respective functions. For example, the key 26 may be a navigation key, selection key, or some other type of key, and the keys 28 may be, for example, soft keys or soft switches. As an example, the navigation key 26 may be used to scroll through lists shown on the display 14, to select one or more items shown in a list on the display 14, etc. The soft switches 28 may be manually operated to carry out respective functions, such as those shown or listed on the display 14 in proximity to the respective soft switch. The display 14, speaker 16, microphone 18, navigation key 26 and soft keys 28 may be used and function in the usual ways in which a mobile phone typically is used, e.g. to initiate, to receive and/or to answer telephone calls, to send and to receive text messages, to connect with and carry out various functions via a network, such as the Internet or some other network, to beam information between mobile phones, etc. These are only examples of suitable uses or functions of the various components, and it will be appreciated that there may be other uses, too.

The mobile telephone 10 includes a display 14. The display 14 displays information to a user such as operating state, time, telephone numbers, contact information, various navigational menus, status of one or more functions, etc., which enable the user to utilize the various features of the mobile telephone 10. The display 14 may also be used to visually display content accessible by the mobile telephone 10. The displayed content may include E-mail messages, geographical information, journal information, photographic images, audio and/or video presentations stored locally in memory 74 (FIG. 4) of the mobile telephone 10 and/or stored remotely from the mobile telephone (e.g., on a remote storage device, a mail server, remote personal computer, etc.), information related to audio content being played through the device (e.g., song title, artist name, album title, etc.), and the like. Such presentations may be derived, for example, from multimedia files received through E-mail messages, including audio and/or video files, from stored audio-based files or from a received mobile radio and/or television signal, etc. The displayed content may also be text entered into the device by the user. The audio component may be broadcast to the user with a speaker 16 of the mobile telephone 10. Alternatively, the audio component may be broadcast to the user though a headset speaker (not shown).

The device 10 optionally includes the capability of a touchpad or touch screen. The touchpad may form all or part of the display 14, and may be coupled to the control circuit 70 for operation as is conventional.

Various keys other than those keys illustrated in FIG. 1 may be associated with the mobile telephone 10 may include a volume key, audio mute key, an on/off power key, a web browser launch key, an E-mail application launch key, a camera key to initiate camera circuitry associated with the mobile telephone, etc. Keys or key-like functionality may also be embodied as a touch screen associated with the display 14.

The mobile telephone 10 includes conventional call circuitry that enables the mobile telephone 10 to establish a call, transmit and/or receive E-mail messages, and/or exchange signals with a called/calling device, typically another mobile telephone or landline telephone. However, the called/calling device need not be another telephone, but may be some other device such as an Internet web server, E-mail server, content providing server, etc.

When the mobile telephone 10 is utilized as a camera as described herein, the display 14 may function as an electronic view finder to aid the user when taking a photograph or a video clip and/or the display may function as a viewer for displaying saved photographs and/or video clips. In addition, in a case where the display 14 is a touch sensitive display, the display 14 may service as an input device to allow the user to input data, menu selections, etc.

Figure 2:
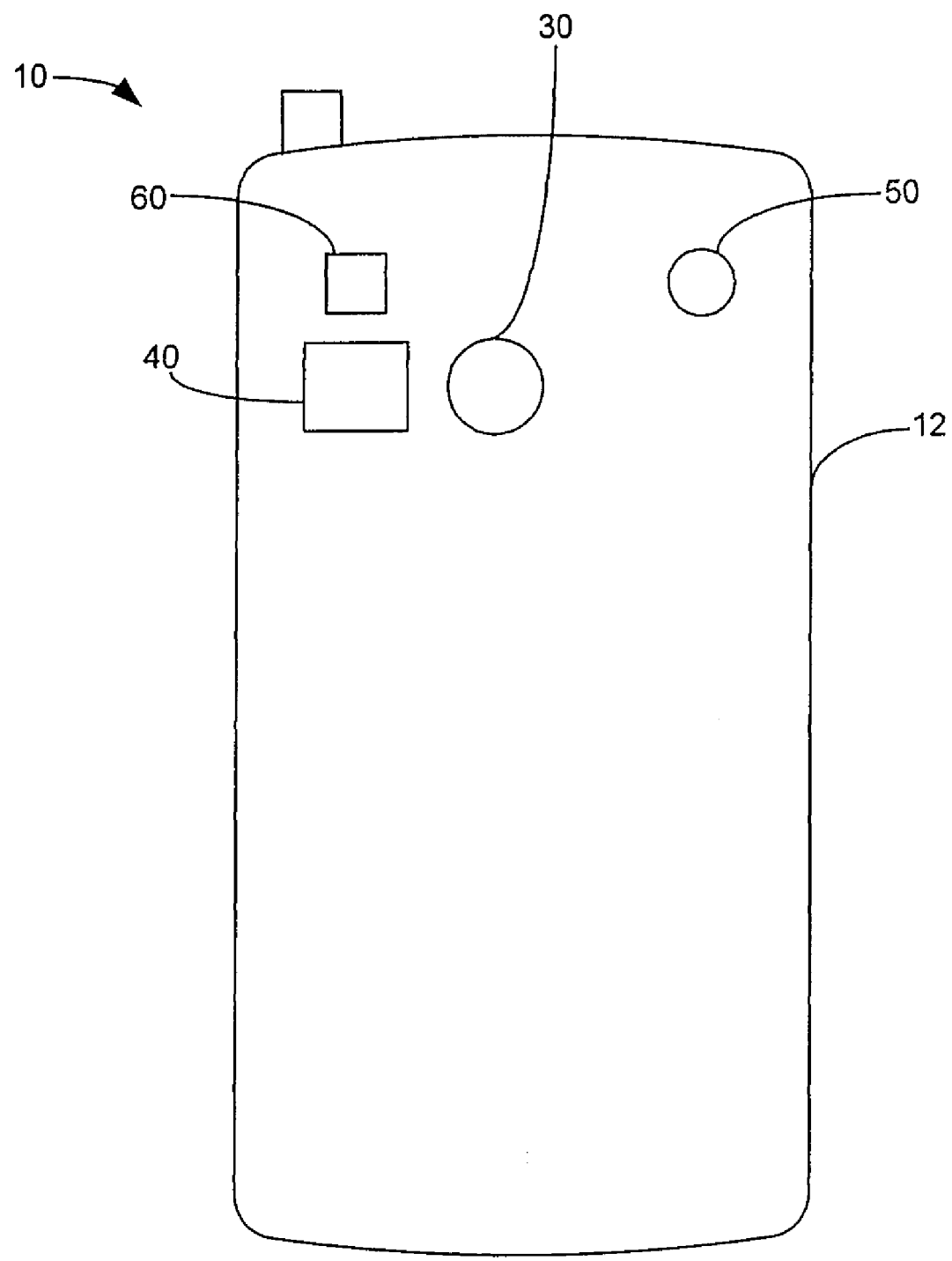
FIG. 2 is a rear view of the electronic device of FIG. 1 in accordance with an exemplary embodiment of the present invention showing a UV filter element in a first position relative to a camera lens.
Figure 3:
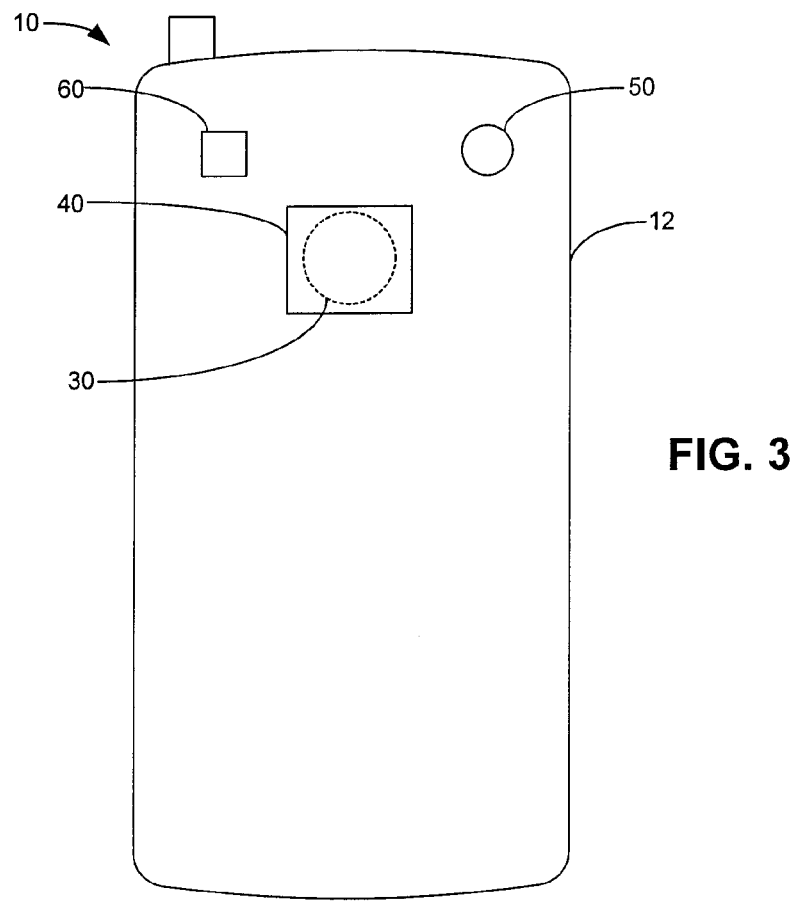
FIG. 3 is a rear view of the electronic device of FIG. 1 in accordance with an exemplary embodiment of the present invention showing a UV filter element in a second position relative to a camera lens.

FIGS. 2 and 3 illustrate the rear of the housing 12 of the mobile telephone 10. As is shown, the rear of the housing 12 includes a camera lens 30, a UV filter element 40, a flash element 50, and optionally a detector 60. The UV filter element 40 is provided to reduce or block ultraviolet (UV) light entering the camera through the lens 30. UV light may have an adverse affect on photos taken with a camera such as by reducing the contrast of the image. The UV filter element 40 is movable relative to the position of the camera lens 30. As shown in FIG. 2, the UV filter element 40 is in a first position relative to the lens 30 and is shown as displaced away from the lens 30. In FIG. 2, the UV filter element is displaced away from the lens 30 in the sense that the UV filter element 40 is not overlying or not covering the lens 30 and is not in the optical pathway of the device. In FIG. 3, the UV filter element 40 is shown in a second position, in which UV filter element 40 is overlying or covering the lens 30. In the second position, the UV filter is at least partially disposed in the optical pathway of the device.

The UV filter element may be mounted to the telephone 10 in any suitable manner such that it is movable from a first position displaced away from (not overlying) the camera lens to a second position overlying or covering the camera lens, or vice versa. For example, the UV filter element 40 may be slideably, pivotally, and/or rotationally mounted to the electronic device to provide that the UV filter element is movable relative to the camera lens. The device further includes a mechanism (not shown) for controlling the movement of the UV filter. The mechanism may be, for example, an actuator that is responsive to an electrical signal.

The UV filter element is not limited and may be any suitable element that is capable of blocking light having a wavelength in the UV region. The term "UV filter element" also encompasses haze and skylight filters that are capable of blocking UV-A bands (which has a wavelength of 320-400 nm).

As described in more detail below, the mobile phone 10 may include a detector 60 for detecting a light feature associated with an ambient light condition. The detector may be, for example, a brightness sensor to detect the brightness of the ambient light, or a UV sensor to detect the UV level of the ambient light.

Figure 4:
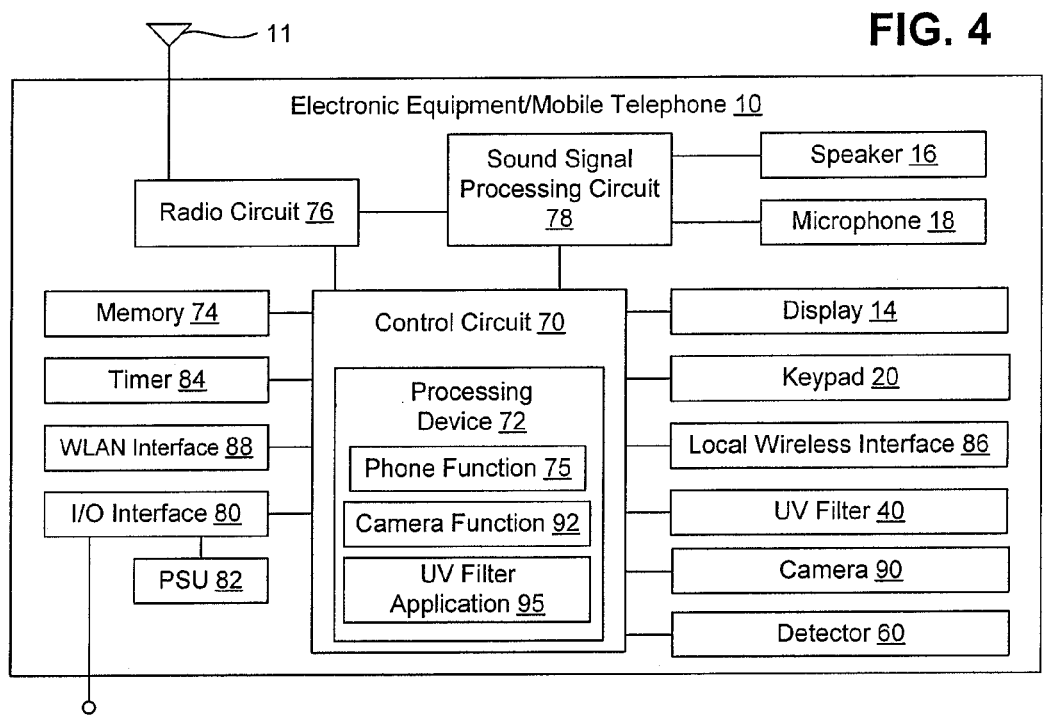
FIG. 4 is a schematic block diagram of the electronic device of FIGS. 1-3 in accordance with an exemplary embodiment of the present invention.

Referring to FIG. 4, a functional block diagram of the mobile telephone 10 is illustrated. The mobile telephone 10 includes a primary control circuit 70 that is configured to carry out overall control of the functions and operations of the mobile telephone 10. The control circuit 70 may include a processing device 72, such as a CPU, microcontroller or microprocessor. The processing device 72 executes code stored in a memory (not shown) within the control circuit 70 and/or in a separate memory, such as memory 74, in order to carry out conventional operation of the mobile telephone function 75.

The memory 74 may be, for example, a buffer, a flash memory, a hard drive, a removable media, a volatile memory and/or a non-volatile memory.

Continuing to refer to FIG. 4, the mobile telephone 10 includes an antenna 11 coupled to a radio circuit 76. The radio circuit 76 includes a radio frequency transmitter and receiver for transmitting and receiving signals via the antenna 11 as is conventional. The mobile telephone 10 generally utilizes the radio circuit 76 and antenna 11 for voice and/or E-mail communications over a cellular telephone network. The mobile telephone 10 further includes a sound signal processing circuit 78 for processing the audio signal transmitted by/received from the radio circuit 76. Coupled to the sound processing circuit 78 are the speaker 16 and the microphone 18 that enable a user to listen and speak via the mobile telephone 10 as is conventional. The radio circuit 76 and sound processing circuit 78 are each coupled to the control circuit 70 so as to carry out overall operation.

The mobile telephone 10 also includes the aforementioned display 14 and keypad 20 coupled to the control circuit 70. The device 10 and display 14 optionally includes the capability of a touchpad or touch screen, which may be all of part of the display 14. The mobile telephone 10 further includes an I/O interface 80. The I/O interface 80 may be in the form of typical mobile telephone I/O interfaces, such as a multi-element connector at the base of the mobile telephone 10. As is typical, the I/O interface 80 may be used to couple the mobile telephone 10 to a battery charger to charge a power supply unit (PSU) 82 within the mobile telephone 10. In addition, or in the alternative, the I/O interface 80 may serve to connect the mobile telephone 10 to a wired personal hands-free adaptor, to a personal computer or other device via a data cable, etc. The mobile telephone 10 may also include a timer 84 for carrying out timing functions. Such functions may include timing the durations of calls and/or events, tracking elapsed times of calls and/or events, generating timestamp information, e.g., date and time stamps, etc.

The mobile telephone 10 may include various built-in accessories. In one embodiment, the mobile telephone 10 also may include a position data receiver, such as a global positioning satellite (GPS) receiver, Galileo satellite system receiver, or the like. The mobile telephone 10 may also include an environment sensor to measure conditions (e.g., temperature, barometric pressure, humidity, etc.) in which the mobile telephone is exposed.

The mobile telephone 10 may include a local wireless interface adapter 86, such as a Bluetooth adaptor to establish wireless communication with other locally positioned devices, such as the a wireless headset, another mobile telephone, a computer, etc. In addition, the mobile telephone 10 may also include a wireless local area network interface adapter 88 to establish wireless communication with other locally positioned devices, such as a wireless local area network, wireless access point, and the like. Preferably, the WLAN adapter 88 is compatible with one or more IEEE 802.11 protocols (e.g., 802.11(a), 802.11(b) and/or 802.11 (g), etc.) and allows the mobile telephone 10 to acquire a unique address (e.g., IP address) on the WLAN and communicate with one or more devices on the WLAN, assuming the user has the appropriate privileges and/or has been properly authenticated.

As shown in FIG. 4, the processing device 72 is coupled to memory 74. Memory 74 stores a variety of data that is used by the processor 72 to control various applications and functions of the device 10. It will be appreciated that data can be stored in other additional memory banks (not illustrated) and that the memory banks can be of any suitable types, such as read-only memory, read-write memory, etc.

Mobile telephone 10 includes a variety of camera hardware 90 to carryout aspects of the present invention. Camera hardware 90 includes the camera lens 30, the UV filter element 40, the flash element 50, as well as a charge-coupled device (CCD) array or other image capture device (not shown) and an image processing circuit, for example. Camera lens 30 serves to image an object or objects to be photographed onto the CCD array. Captured images received by the CCD are input to an image processing circuit, which processes the images under the control of the camera functions 92 so that photographs taken during camera operation are processed and, image files corresponding to the pictures may be stored in memory 74, for example.

When wishing to take a picture with the mobile telephone 10, a user presses a button or other suitable mechanism to initiate the camera circuitry 90 and/or camera function 92. The control circuit processes the signal generated from the user pressing the appropriate buttons. The user is then able to take a photograph and/or video clip in a conventional manner. In this example, the image received by the CCD sensor may be provided to the display 14 via the camera function 68 so as to function as an electronic viewfinder.

In accordance with aspects of the present invention, the mobile telephone 10 is configured for automatically moving the position of the UV filter element 40 in relation to the camera lens. The UV filter 40 may be automatically moved into or out of a position overlying the lens based on a determination by the electronic device (e.g., mobile phone 10) of one or more light features associated with the ambient light. Examples of suitable light features that may be usable for indicating that the UV filter should or should not be moved to a position overlying the lens include, but are not limited to, the brightness of the ambient light condition and/or the UV level of the ambient light condition.

The mobile telephone 10 may include a UV filter application 95 associated with the processing device 73 and control circuit 70. The UV filter application may include logic to execute code to receive and/or determine data related to the determined light feature associated with the ambient light. The UV filter application may be further configured to determine the position of the UV filter element 40 relative to the lens, determine if the position of the UV filter element should be changed based on the light data related to the ambient light condition and/or generate a command to move the UV filter element into the desired position.

The electronic device, e.g., mobile telephone 10, includes an apparatus for detecting a light feature associated with an ambient light condition. In particular, the apparatus should be able to detect a light feature associated with an ambient light condition that may be quantifiable as a data value by the electronic device. The determined light data may be used to determine if the UV filter 40 should be moved into a position overlying the camera lens or if the UV filter 40 should be moved into a position that is displaced away from the camera lens, i.e., a position that it is not overlying the camera lens. In one aspect, the camera lens itself may be suitable as the apparatus for detecting a light feature of the ambient light. For example, the camera functionality may be suitable for determining the brightness of the ambient light. In another aspect, the apparatus for detecting a light feature associated with the ambient light may be a separate element such as the detector 60 in FIGS. 2 and 3. In one embodiment, the detector 60 may be a light sensor or brightness sensor to detect the brightness of the ambient light. In another embodiment, the detector 60 may be a UV detector for determining the UV level of the ambient light.

Figure 5:
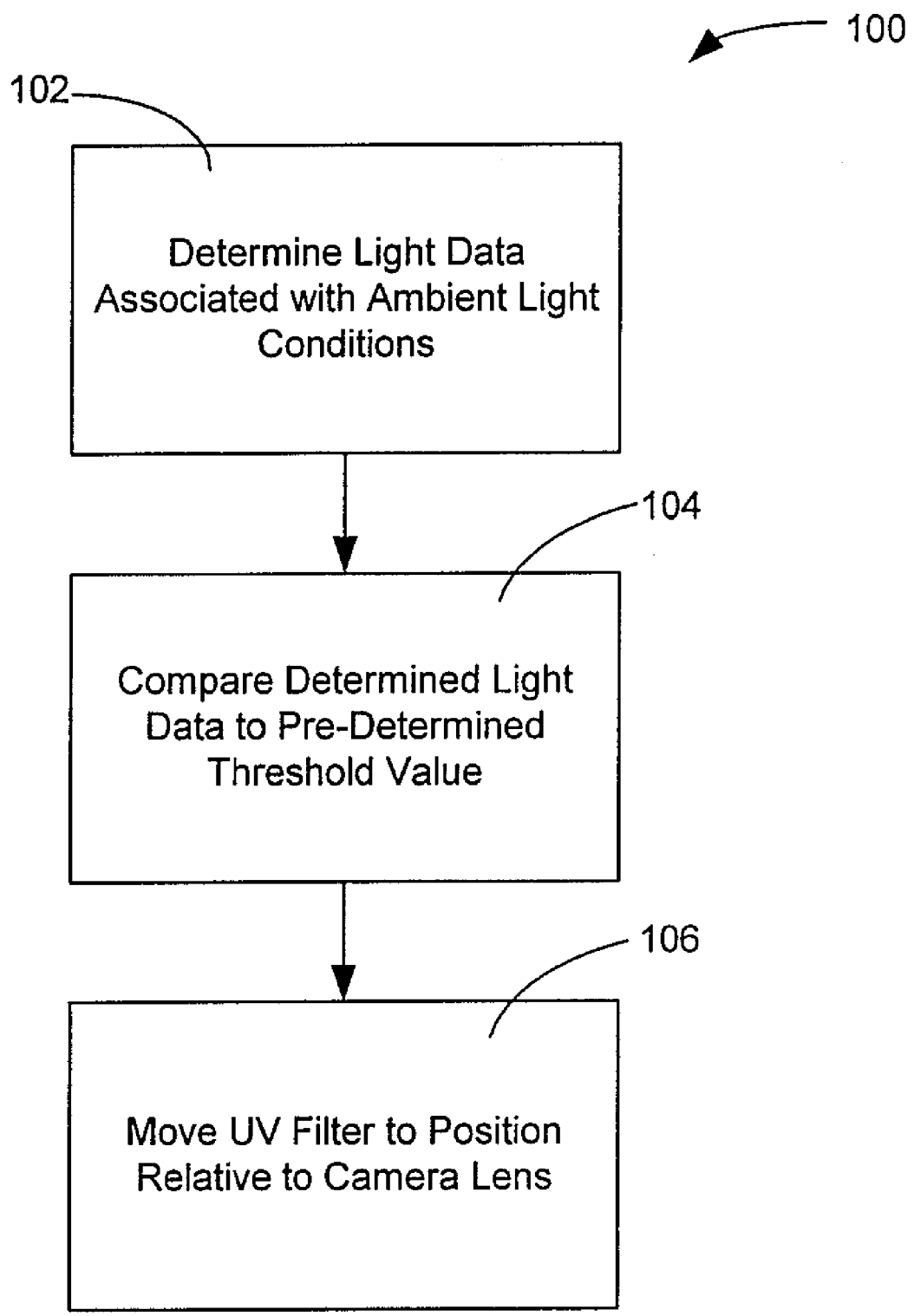
FIG. 5 is a schematic flow chart illustrating operation of a UV filter lens in accordance with an embodiment of the present invention.

Referring to FIG. 5, a process 100 for moving the UV filter 40 into a position overlying the camera lens or displaced away from the camera lens is shown. Processing 100 includes determining a light feature and light data associated with the ambient light condition (functional block 102). At functional block 104, the light data associated with the ambient light condition is compared to a predefined, threshold level for the particular light feature of interest associated with the ambient light condition. At functional block 106, the UV filter application 95 (FIG. 4) issues a command to move the UV filter 40 into a position overlying the camera lens or displaced away from the camera lens based on the comparison conducted at functional block 104. The command may be in the form of an electrical signal to the actuator. The actuator moves in response to the electrical signal and causes the UV filter element to move. The camera may be programmed, for example, to recognize that the UV filter 40 should be overlying the camera lens when the determined light data has a value or level greater than the predefined threshold value, and the UV filter 40 should be positioned or displayed away from the camera lens 30 when the value for the determined light data associated with the ambient light condition is below the predefined threshold level.

Figure 6:
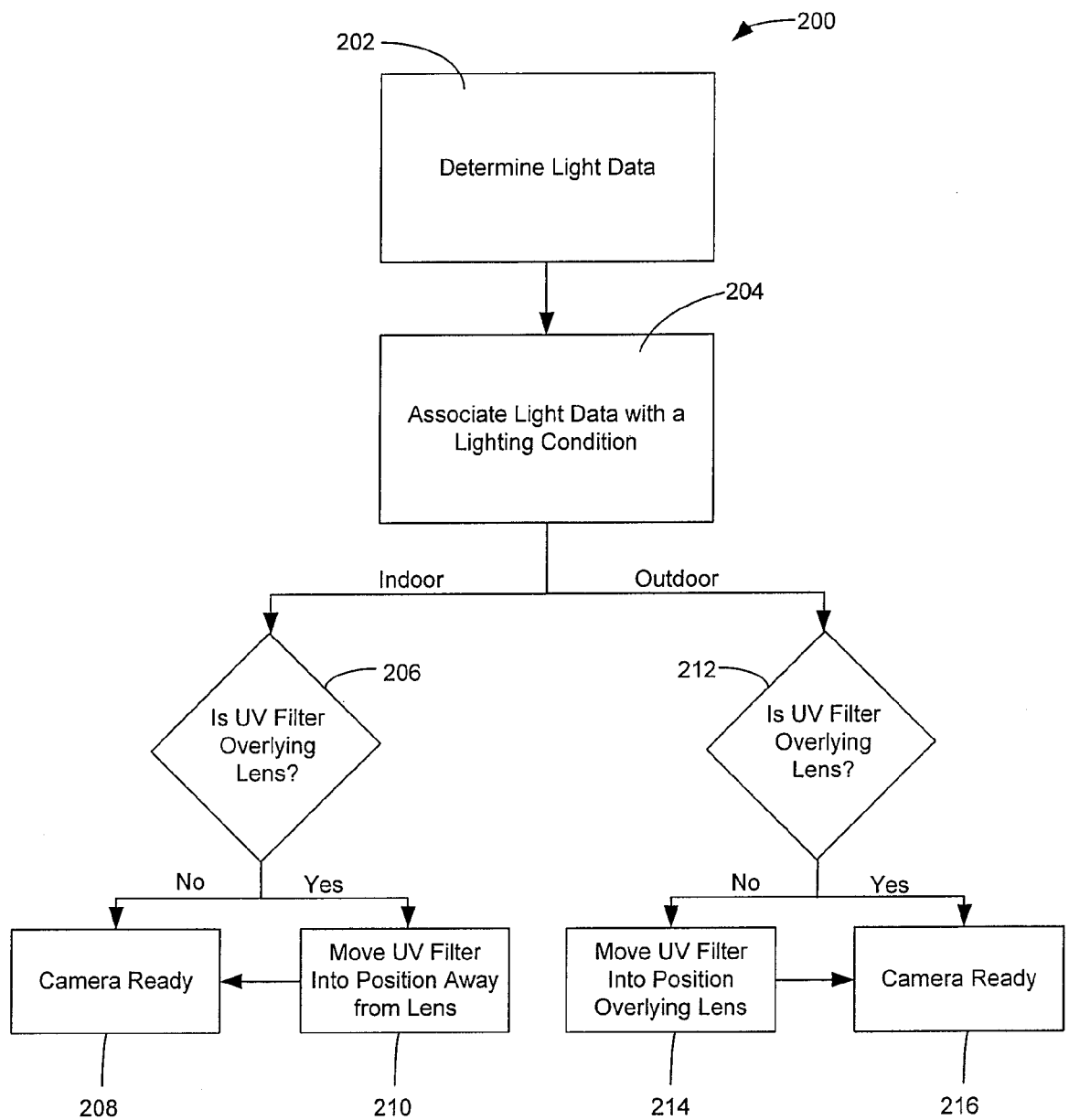
FIG. 6 is a schematic flow chart illustrating operation of a UV filter lens control in accordance with an embodiment of the present invention.

In one embodiment, the position of the UV filter 40 may be automatically moved based on a determination that the ambient light condition relates to an indoor or outdoor lighting condition. Referring to FIG. 6, a method 200 for moving the UV filter into a desired position is shown. At functional block 202, the sensor determines data associated with the ambient light condition. At functional block 204, the data associated with the ambient light condition is associated with either an indoor lighting environment or an outdoor lighting environment. For example, light data above a threshold level may be associated with an outdoor lighting condition, which may be expected to have a UV level such that the UV filter 40 may be desirable, and light data below a threshold level may be associated with an indoor lighting condition, which may not necessitate use of the UV filter 40. If the light data is associated with an indoor lighting condition, the process proceeds to functional block 206. At functional block 206, the UV filter application 95 determines if the UV filter 40 is oriented such that it is overlying or covering the camera lens 30. If the UV filter 40 is not overlying the lens, the process proceeds to functional block 208, and the camera is ready for use. If the UV filter 40 is in a position overlying the lens, the process proceeds to functional block 210, and the UV filter application 95 generates a command to move the UV filter 40 into a position such that is not overlying the camera lens 30. After the UV filter 40 is moved into a position such that it is not overlying the lens, the camera is then ready for use in the indoor lighting environment (functional block 208).

If the application determines that the electronic device is in an outdoor lighting environment, the process proceeds to functional block 212, and the UV filter application 95 determines if the UV filter is oriented in a position such that it is overlying the camera lens. If the UV filter application 95 determines that the UV filter is oriented in a position overlying the camera lens, the process proceeds to functional block 216, and the camera is ready for use. If the UV filter application 95 determines at functional block 212 that the UV filter is not oriented such that it is overlying the camera lens, the process proceeds to functional block 214. At functional block 214, the UV filter application 95 issues a command, and the processor executes logic and code to move the UV filter into a position such that it is overlying the camera lens 30.

Figure 7:
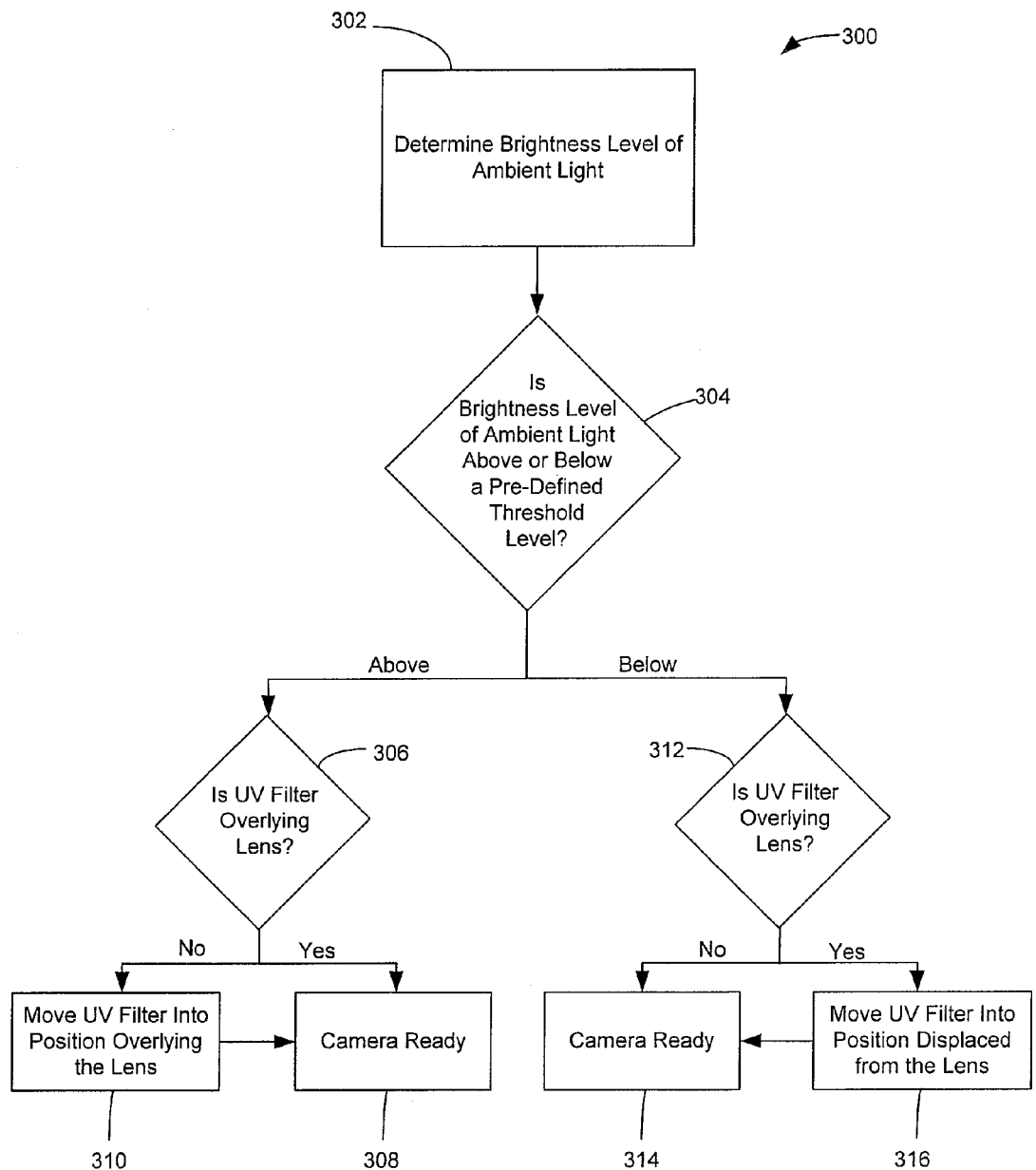
FIG. 7 is a schematic flow chart illustrating operation of a UV filter lens in accordance with another embodiment of the present invention.

In one embodiment, as previously discussed, the electronic device may detect the brightness of the ambient light condition in which the electronic device is present. This may be accomplished, for example, by a light sensor mounted on the electronic device. The determined brightness of the ambient light may be used by the processor and UV filter application 95 to determine if the UV filter 40 should be moved into or out of a position overlying camera lens. Referring to FIG. 7, a process 300 for automatically moving a UV filter 40 into or out of a position overlying the camera lens is shown. At functional block 302, the brightness sensor determines the brightness level of the ambient light. At functional block 304, the UV filter application 95 determines if the brightness determined by the sensor is above or below a threshold brightness level. If the brightness is above a threshold level, the UV filter application 95 determines if the UV filter 40 is in a position overlying the camera lens (functional block 306). If the UV filter 40 is in a position such that it is overlying the lens, the camera is ready for use (functional block 308). If the UV filter 40 is not in a position overlying the lens, the process proceeds to functional block 310, and the UV filter application 95 generates a command to move the UV filter 40 into a position overlying the camera lens. The process may then proceed to functional block 308, where it is ready for use.

If the brightness level determined by the sensor is below a threshold brightness level, the process may proceed to functional block 312, where the UV filter application 95 determines if the UV filter 40 is in a position such that it is overlying the camera lens 30. If the UV filter is oriented such that it is not overlying the camera lens, the camera is ready for use (functional block 314). If the UV filter 40 is oriented such that it is overlying the camera lens 30, the process proceeds to functional block 316, and the UV filter application 95 issues a command for the UV filter 40 to be moved such that is not overlying the camera lens 30. When the UV filter 40 is positioned such that it is not overlying the lens, the camera is ready for use (functional block 314).

Figure 8:
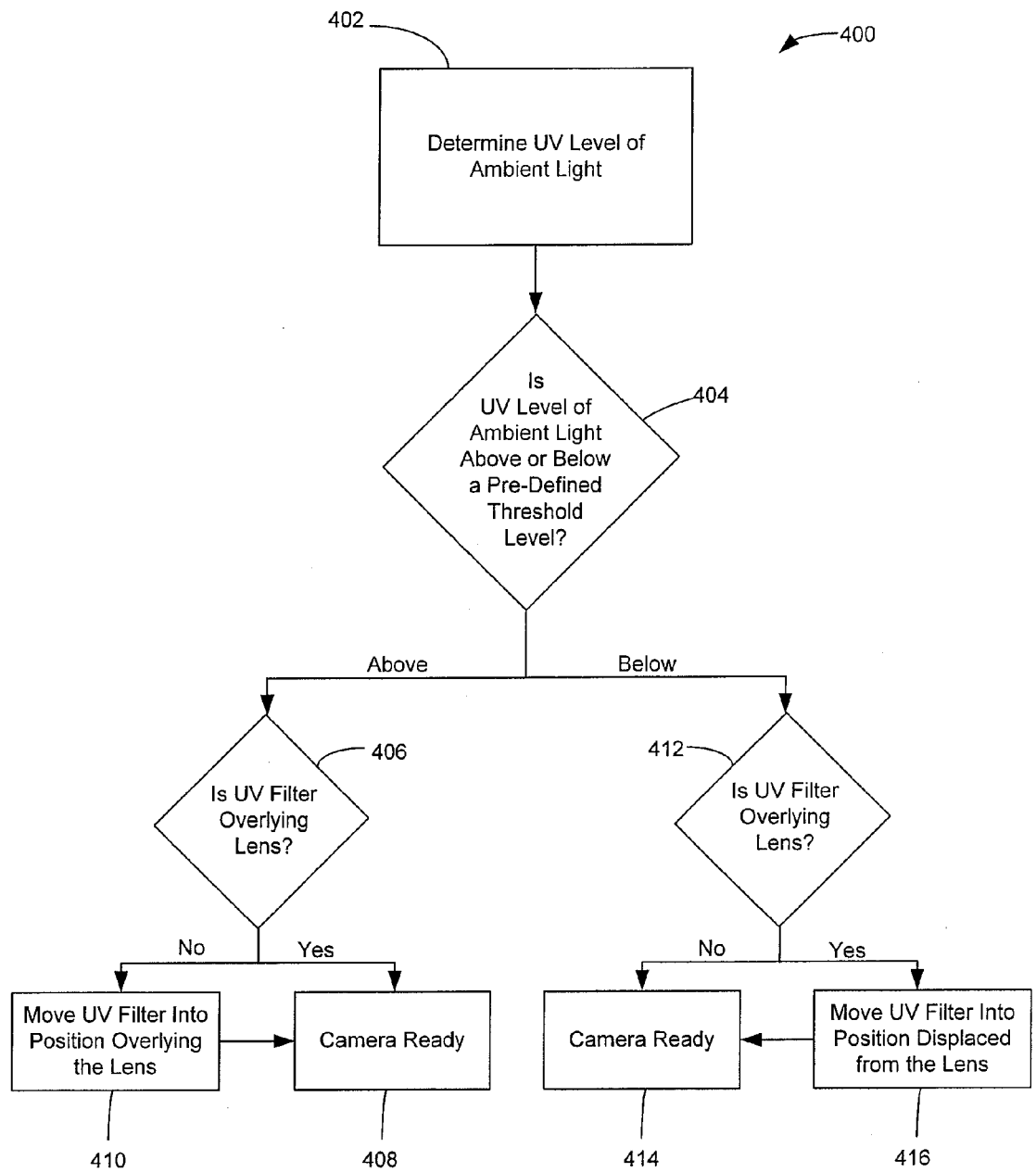
FIG. 8 is a schematic flow chart illustrating operation of a UV filter lens in accordance with still another embodiment of the present invention.

In another embodiment, the electronic device may include a UV sensor to determine the UV level of the ambient light. The determined UV level may be used to control the position of the UV filter 40 on the electronic device. Referring to FIG. 8, a process 400 for automatically moving a UV filter 40 into or out of a position overlying the camera lens is shown. At functional block 402, the UV sensor determines the UV level of the ambient light. At functional block 404, the UV filter application 95 determines if the UV level determined by the sensor is above or below a threshold UV level. If the UV level is above a threshold level, the UV filter application 95 determines if the UV filter 40 is in a position overlying the camera lens (functional block 406). If the UV filter 40 is in a position such that it is overlying the lens 30, the camera is ready for use (functional block 408). If the UV filter 40 is not in a position overlying the lens, the process proceeds to functional block 410, and the UV filter application 95 generates a command to move the UV filter 40 into a position overlying the camera lens 30. The process may then proceed to functional block 408, where it is ready for use.

If the UV level determined by the sensor is below a threshold UV level, the process may proceed to functional block 412, where the UV filter application 95 determines if the UV filter 40 is in a position such that it is overlying the camera lens. If the UV filter 40 is oriented such that it is not overlying the camera lens, the camera is ready for use (functional block 414). If the UV filter 40 is oriented such that it is overlying the camera lens 30, the process proceeds to functional block 416, and the UV filter application 95 issues a command for the UV filter 40 to be moved such that is not overlying the camera lens 30. When the UV filter 30 is positioned such that it is not overlying the lens 30, the camera is ready for use (functional block 414).

The processes described with respect to FIGS. 7 and 8 may be applicable to the process described in FIG. 6. For example, in an embodiment in which the electronic device determines the brightness of the ambient light, a determination that the ambient light has a brightness below a pre-defined, threshold level may relate to a determination in the process of FIG. 6 that the ambient light relates to an indoor lighting condition and a determination that the brightness of the ambient light is above a pre-defined threshold level may relate to a determination in the process of FIG. 6 that the ambient light condition relates to an outdoor lighting condition. In an embodiment in which the electronic device includes a UV sensor, a determination that the UV level is below a pre-defined threshold UV level may relate to a determination in the process of FIG. 6 that the ambient light condition relates to an indoor lighting condition and a determination that the UV level is above a pre-defined, threshold UV level may relate to a determination that the ambient light condition relates to an outdoor lighting condition.

The pre-defined, threshold level for the light feature associated with the ambient light condition is not limited and may be selected as desired for a particular purpose of intended use. For example, in one embodiment, the light data may relate to brightness, which may be presented in lux units. Bright sunlight may provide a brightness of between 50,000 and 100,000 lux, and a well-lighted room (even with windows) may have a brightness of from about 500 and about 700 lux. Higher brightness values may indicate that the ambient light condition is from sunlight, which may indicate a high UV content from the light source. Thus, for example, the device may be programmed to set the threshold brightness level at 1,000 lux, 5,000 lux, 10,000 lux, 20,000 lux, or the like, and a determined brightness level at or above the threshold level may be used to indicate that the UV filter should be moved into a position overlying the lens, while a determined brightness level below the threshold level may be used to indicate that the UV filter should be displaced away from the lens. Similarly, where the detector determines the UV level of the ambient light, the threshold level may be set at a particular level (e.g., a particular UV index) and a determined UV level above the threshold may indicate that the UV filter should be overlying the lens, and a UV level below the threshold level may indicate that the UV filter is not required and should be moved into a position such that it is not overlying the lens. The threshold level may be pre-programmed into the device's software or may be selectable or changeable by the user.

In one aspect, the UV filter may be automatically moved into or out of a position overlying the camera lens based on the determined ambient light condition corresponds. In another aspect, after determining the ambient light condition, the UV filter application may issue a command to display a message on the display to request user confirmation that the UV filter should be moved into or out of a position overlying the camera lens.

It will be appreciated that the auto UV filter functionality, as implemented by the various programs and applications, may be provided such that a user may selectively disable or enable the functionality as desired. For example, a device may have menu options that allow a user to select when the auto UV filter functionality should or should not be enabled.

The electronic device may include a manual mode for positioning the UV filter over or away from the camera lens. The manual mode may be operational by a button (not shown) located on the electronic device or may be responsive to a program operated by the user via the user interface and various prompts or messages appearing on the display. The manual mode may be operational when the UV filter application is disabled, or for the user to override the automatic positioning of the UV filter from the operation of the UV filter application.

Computer program elements of the invention may be embodied in hardware and/or in software (including firmware, residence software, micro-code, etc.). The invention may take the form of a computer program product, which can be embodied by a computer-useable or computer-readable storage medium having computer-usable or computer-readable program instructions, "code" or "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, micromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with reference to certain exemplary embodiments, it is understood that equivalents and modifications may occur to others skilled in the art upon reading and understanding the specification. The present invention is intended to include all such equivalents and modifications as they come within the scope of the following claims.

The invention claimed is:

1. A portable communication device comprising:
camera circuitry for carrying out a camera related operation;
a camera lens operatively coupled to the camera circuitry to focus the camera lens;
a UV filter element moveable between a first position displaced away from the lens and a second position overlying the lens;
an apparatus for detecting a light feature associated with an ambient light condition; and
a processing circuit including logic to execute code to:
obtain light data related to the detected light feature associated with the ambient light; and
generate a command to drive the movement of the UV filter element into the first or second position based on the light data obtained from the apparatus,
wherein the apparatus for detecting a light feature associated with an ambient light condition is a UV sensor, and the UV sensor detects a UV level associated with the ambient light, and wherein the processing circuit drives the UV filter to the first or second position based on a comparison of the determined UV level relative to a threshold UV level.

2. The device of claim 1, wherein the processing circuit associates the light data from the sensor with (i) an outdoor lighting condition, or (ii) an indoor lighting condition.

3. The device of claim 2, wherein the processing circuit drives the movement of the UV filter into the second position overlying the lens upon a determination that the light data is associated with an outdoor lighting condition.

4. The device of claim 2, wherein the processing circuit drives the movement of the UV filter into a first position displaced away from the lens upon a determination that the light data is associated with an indoor lighting condition.

5. A method for automatically positioning a UV filter relative to a camera lens on a portable network communication device having a lens and a camera functionality, the method comprising:
determining light data associated with an ambient light condition, wherein determining the light data comprises determining a UV level associated with the ambient light condition;
determining, based on the determined light data, if the UV filter element should be in a position (i) overlying the lens, or (ii) displaced away from the camera lens; and
controlling a mechanism to move the UV filter element into or out of a position overlying the lens, (i) moving the UV filter into a position overlying the lens when the UV level is above a threshold UV level, and/or (ii) moving the UV filter into a position displaced away from the lens when the UV level is below a threshold UV level.

6. The method of claim 5, comprising:
associating the light data with (i) an outdoor lighting condition, or (ii) an indoor light condition; and
moving the UV filter into a position overlying the lens in response to the light data being associated with an outdoor lighting condition, or moving the UV filter into a position displaced away from the lens in response to the light data being associated with an indoor lighting condition.

* * * * *